(12) United States Patent
Mackin et al.

(10) Patent No.: US 7,059,960 B2
(45) Date of Patent: Jun. 13, 2006

(54) COMPOSITE THRESHING ELEMENT FOR A COMBINE ROTOR

(75) Inventors: Ryan Patrick Mackin, Milan, IL (US); Daniel Marc Heim, Zweibruecken (DE); Kevin Laverne Ehrecke, Davenport, IA (US); Corwin Marcus Raymond Puryk, East Moline, IL (US); Mark Frederick Stickler, Silvis, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/626,220

(22) Filed: Jul. 24, 2003

(65) Prior Publication Data

US 2005/0020330 A1    Jan. 27, 2005

(51) Int. Cl.
*A01F 12/22*    (2006.01)
(52) U.S. Cl. .......................................... 460/71; 460/68
(58) Field of Classification Search ................. 460/71, 460/72, 70, 68, 69, 66, 59, 79, 80
See application file for complete search history.

(56) References Cited

U.S. PATENT DOCUMENTS

| 3,827,443 | A | * | 8/1974 | Drayer ........................ 460/16 |
| 4,139,013 | A | | 2/1979 | Hengen ..................... 130/27 H |
| 4,148,323 | A | * | 4/1979 | McMillen et al. ............ 460/70 |
| 4,178,943 | A | * | 12/1979 | West ............................. 460/80 |
| 4,505,279 | A | | 3/1985 | Campbell et al. .......... 130/27 T |
| 4,889,517 | A | * | 12/1989 | Strong et al. ................. 460/66 |
| 4,964,838 | A | | 10/1990 | Cromheecke et al. ......... 460/66 |
| 5,919,086 | A | * | 7/1999 | Derry ........................... 460/72 |
| 6,083,102 | A | | 7/2000 | Pfeiffer et al. ................ 460/68 |
| 6,688,970 | B1 | * | 2/2004 | Tanis ........................... 460/68 |

* cited by examiner

*Primary Examiner*—Meredith Petravick

(57) ABSTRACT

A composite threshing element, for a rotor in an agricultural harvester crop processing unit, comprising a hollow support structure with at least one outwardly extending crop engaging portion, and a forwardly extending infeed element attachment feature. The rotor comprises a drum to which crop processing elements for an infeed section and a threshing section are affixed. The threshing element is bolted to a frusto-conical portion of the rotor drum, with a portion of an infeed element bolting to the infeed element attachment feature.

12 Claims, 3 Drawing Sheets

COMPOSITE THRESHING ELEMENT FOR A COMBINE ROTOR

FIELD OF THE INVENTION

The present invention is for a composite threshing element for a combine rotor having one or more crop engaging elements and a feature for securing a portion of a rotor infeed element.

BACKGROUND OF THE INVENTION

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Rotary combines have one or two large rotors for threshing and separating the harvested crop material. In most rotary combines the rotor or rotors are arranged along the longitudinal axis of the machine. These rotors are provided with an infeed section for receiving harvested crop material, a threshing section for threshing the harvested crop material received from the infeed section and a separating section for freeing grain trapped in the threshed crop material received from the threshing section.

The rotor comprises a drum to which crop processing elements for the infeed section, threshing section, and separating section are affixed. Threshing elements have been provided for combines in a variety of configurations to optimize harvesting efficiency for a wide variety of crops and crop conditions. Examples include variations in geometry and location along the rotor. Such examples are disclosed in U.S. Pat. Nos. 4,964,838, 5,376,047, and 6,036,598.

SUMMARY OF THE INVENTION

The present invention is for a composite threshing element for a combine rotor. The threshing element comprises of a hollow support structure with one or more outwardly extending crop engaging portions, and a forwardly extending infeed element attachment feature. The threshing element attaches to the rotor drum, while the rearward portion of the infeed element attaches to the infeed element attachment feature of the threshing element. Additionally, the threshing element is designed to mate with a frusto-conical drum portion of the rotor drum.

DETAILED DESCRIPTION

Figure 1:
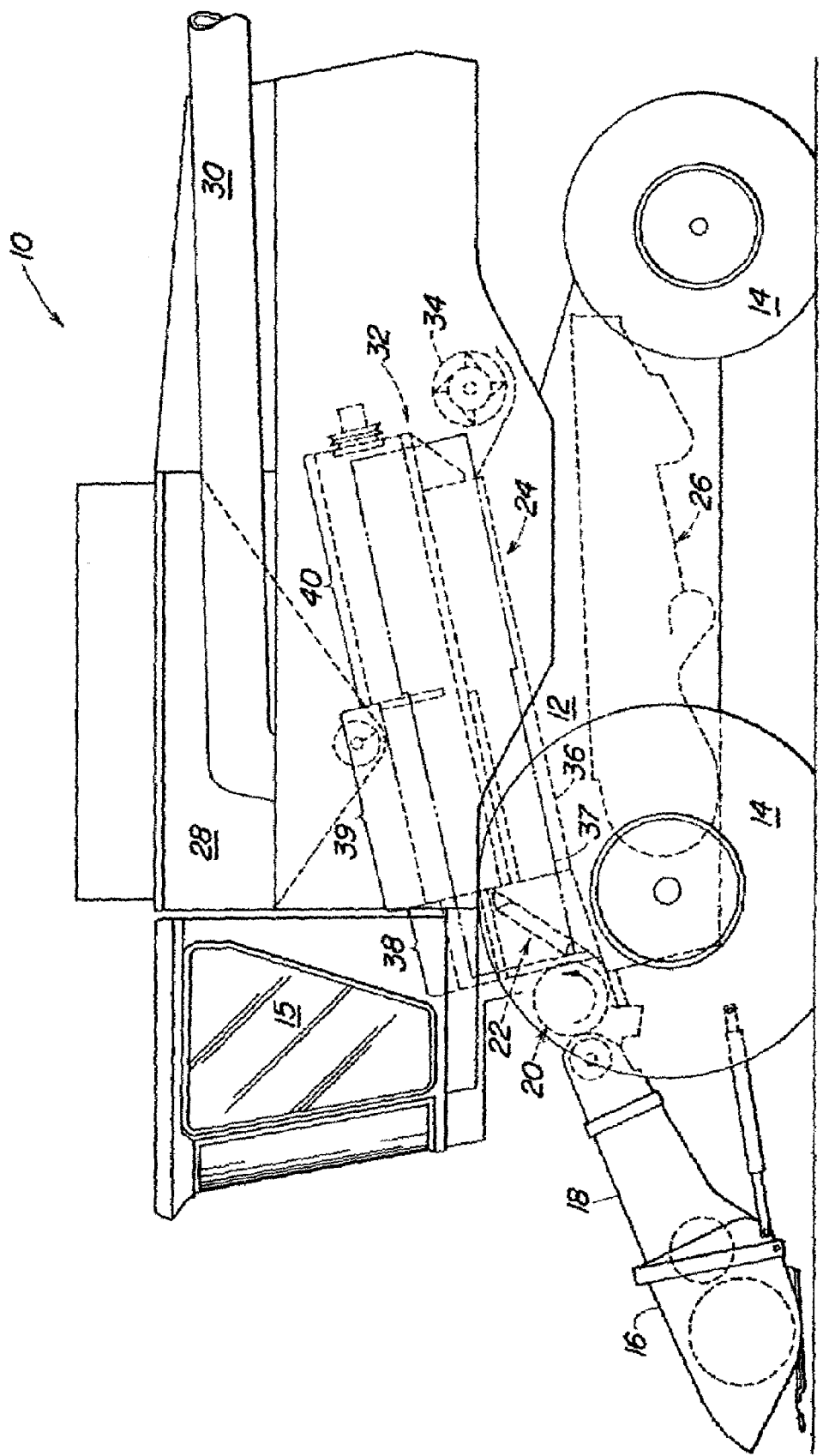
FIG. 1 is a semi-schematic side view of a rotary agricultural combine.
Figure 2:
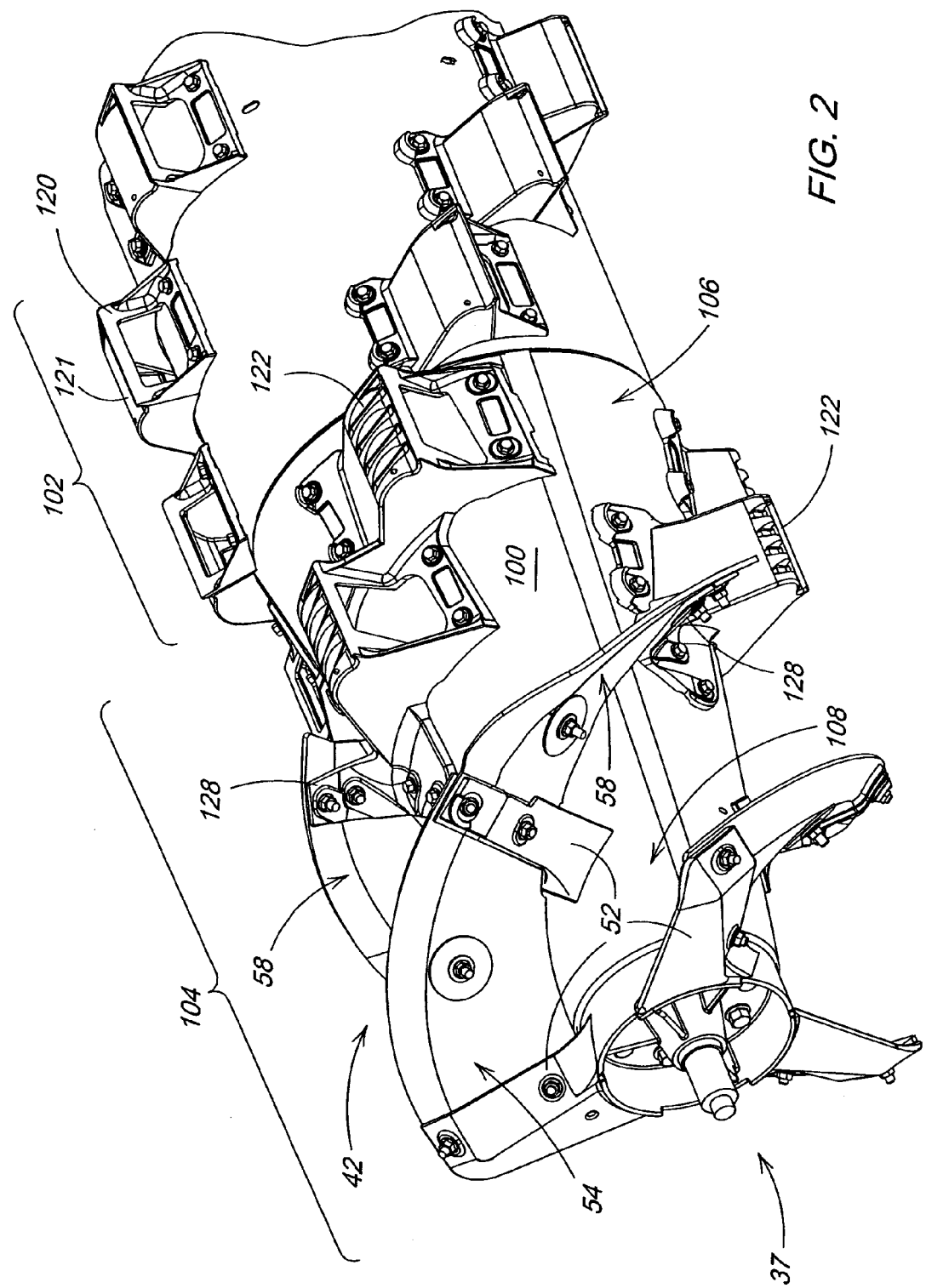
FIG. 2 is a perspective view of the infeed and threshing sections of the rotor.
Figure 3:
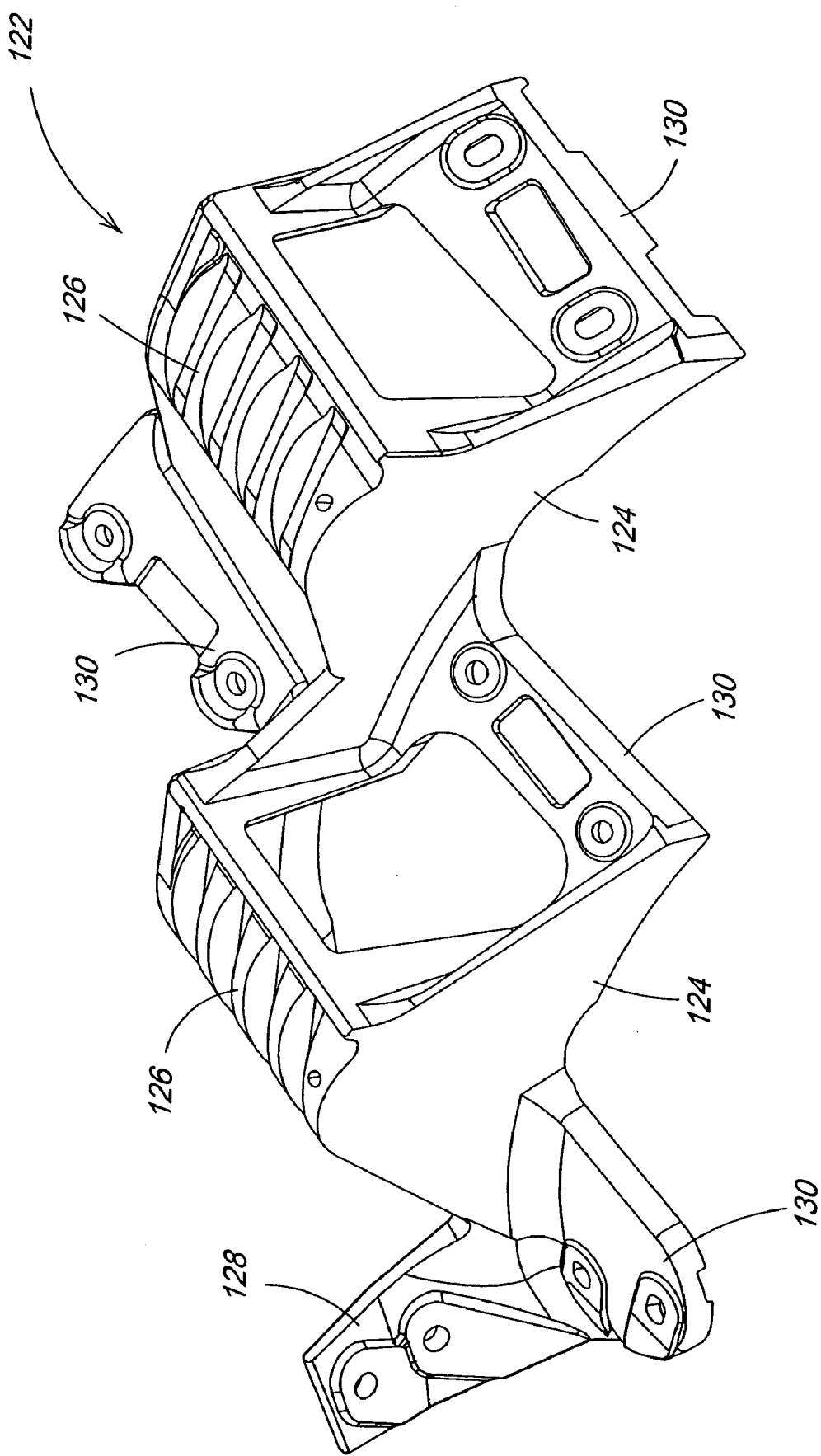
FIG. 3 is a perspective view of the composite threshing element for the rotor.

FIG. 1 shows an agricultural combine 10 comprising a supporting structure 12 having ground engaging wheels 14 extending from the supporting structure. The operation of the combine is controlled from operator's cab 15. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit 24 threshes and separates the harvested crop material. Grain and chaff fall through grates on the bottom of the unit 24 to the cleaning system 26. The cleaning system 26 removes the chaff and directs the clean grain to a clean grain elevator (not shown). The clean grain elevator deposits the clean grain in grain tank 28. The clean grain in the tank 28 can be unloaded into a grain cart or truck by unloading auger 30. Threshed and separated straw is discharged from the axial crop processing unit 24 through outlet 32 to discharge beater 34. The discharge beater 34 in turn propels the straw out the rear of the combine.

The axial crop processing unit 24 comprises a rotor housing 36 and a rotor 37 located inside the housing 36. The front part of the rotor 37 and the rotor housing 36 define the infeed section 38 of the crop processing unit. Longitudinally downstream from the infeed section 38 are threshing section 39 and separating section 40. The rotor 37 comprises a drum 100 to which crop processing elements for the infeed section, threshing section, and separating section are affixed. The drum 100 comprises a rearward cylindrical portion 102 and a forwardly extending frusto-conical portion 104. The surface of the frusto-conical portion 104 is divided into an aft-region 106 adjacent to the rearward cylindrical portion 104 of the drum, and a fore-region 108.

The rotor 37 in the infeed section 38 is provided with helical infeed elements 42 located on the fore-region 108 of the frusto-conical portion of the drum. The helical infeed elements 42 engage harvested crop material received from the beater 20 and inlet transition section 22. The infeed elements 42 are comprised of a forward portion 54 and a rearward portion 58. The forward portion 54 of each infeed element 42 is bolted to the drum 100 by mounting assemblies 52. The rearward portion 58 of each infeed element 42 is bolted to an infeed element attachment feature 128 extending from an adjacent threshing element 120.

Immediately downstream from the infeed section 38 is the threshing section 39 of the crop processing unit 24. In the threshing section 39 the rotor 37 is provided with a number of threshing elements 120 and 122 for threshing the harvested crop material received from the infeed section 38. Threshing elements 122 are attached to the aft-region 106 of the frusto-conical portion of the drum, with threshing elements 120 attached to the rearward cylindrical portion 102. The threshing elements 120 located on the cylindrical portion 102 of the drum 50 each comprise a hollow support structure with one crop engaging portion 121.

The threshing elements 122 located on the aft-region 106 of the frusto-conical portion of the drum 50 are composite threshing elements comprising a hollow support structure 124 with two outwardly extending crop engaging portions 126 that sweep a cylindrical path upon rotation of the rotor. Extending forward from the threshing element 122 is the aforementioned infeed element attachment feature 128 to which the rearward portion 58 of the adjacent infeed element 42 is attached. The base of the threshing element 122 is provided with mounting flanges 130, through which mounting bolts 57 pass for securing the threshing element 122 to the drum 100.

The threshing elements 122 are shown in the illustrated embodiment with two crop engaging portions 126 fixed in a staggered arrangement, however, they may be provided with one or more crop engaging portions 126 in a variety of arrangements. Additionally, the crop engaging portions 126 are illustrated with rasp features, but may also be provided with other surface profiles, such as that disclosed in U.S. Pat. No. 6,036,598.

The outwardly extending crop engaging portions 126 are shown in the illustrated embodiment as sweeping a cylindrical path with a common diameter to the path swept by the crop engaging portion 121 of threshing elements 120 on the rearward cylindrical portion 102 of the rotor drum. However, the crop engaging portions 126 of the composite threshing elements 122 could be adapted to sweep cylindrical path diameters different than those of the crop engaging portion 121 of threshing elements 120, or of adjacent crop engaging portions 126 of the same threshing element 122.

Having described the illustrated embodiment, it will become apparent that various modifications can be made without departing from the scope of the invention as defined in the accompanying claims.

What is claimed is:

1. In an agricultural harvester having a crop processing unit comprising a rotor and a housing, the rotor comprising an axially extending drum and having a crop processing section provided with at least one crop processing element, the crop processing element comprising:
   a support structure being attached to the rotor;
   at least one crop engaging portion extending from the support structure;
   an infeed element attachment feature extending from the support structure wherein the crop processing element is located on a frusto-conical portion of the rotor.

2. The crop processing element described in claim 1 wherein the infeed element attachment feature is adapted to secure a rearward portion of an infeed element.

3. The crop processing element described in claim 2 wherein the infeed element is a helical infeed flight.

4. The crop processing element described in claim 3 wherein the crop engaging portion of the crop processing element sweeps a cylindrical path upon rotation of the rotor.

5. The crop processing element described in claim 1 wherein the crop processing section is a threshing section and the crop processing element is a threshing element.

6. In an agricultural harvester having a crop processing unit comprising a rotor and a housing, the rotor comprising an axially extending drum and having a crop processing section provided with at least one crop processing element located on a frusto-conical portion of the rotor, the crop processing element comprising:
   a support structure being attached to the rotor;
   at least one crop engaging portion extending from the support structure that sweeps a cylindrical path upon rotation of the rotor wherein an infeed element attachment feature extends from the support structure of the crop processing element.

7. The crop processing element described in claim 6 wherein the crop processing section is a threshing section and the crop processing element is a threshing element.

8. The crop processing element described in claim 6 wherein the infeed element attachment feature is adapted to secure a rearward portion of the infeed element.

9. The crop processing element described in claim 8 wherein an infeed element is a helical infeed flight.

10. In an agricultural harvester having a crop processing unit comprising a rotor and a housing, the rotor comprising an axially extending drum and having a crop processing section provided with at least one crop processing element located on a frusto-conical portion of the rotor, the crop processing element comprising:
    a support structure being attached to the rotor;
    at least one crop engaging portion extending from the support structure that sweeps a cylindrical path upon rotation of the rotor;
    an infeed element attachment feature extending from the support structure.

11. The crop processing element described in claim 10 wherein an infeed element attachment feature is adapted to secure a rearward portion of the infeed element.

12. The crop processing element described in claim 11 wherein the infeed element is a helical infeed flight, the crop processing section is a threshing section, and the crop processing element is a threshing element.

* * * * *